US011908402B1

(12) United States Patent
Li et al.

(10) Patent No.: US 11,908,402 B1
(45) Date of Patent: Feb. 20, 2024

(54) DISPLAY DEVICE AND DISPLAY METHOD

(71) Applicant: HKC CORPORATION LIMITED, Shenzhen (CN)

(72) Inventors: Jianlei Li, Shenzhen (CN); Zhicheng Tao, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/333,883

(22) Filed: Jun. 13, 2023

(30) Foreign Application Priority Data

Dec. 19, 2022 (CN) ......................... 202211631618.9

(51) Int. Cl.
*G09G 3/3225* (2016.01)
*G09G 3/36* (2006.01)

(52) U.S. Cl.
CPC ......... *G09G 3/3225* (2013.01); *G09G 3/3614* (2013.01); *G09G 3/3648* (2013.01); *G09G 2300/0852* (2013.01); *G09G 2310/08* (2013.01); *G09G 2320/0626* (2013.01); *G09G 2330/021* (2013.01); *G09G 2360/144* (2013.01)

(58) Field of Classification Search
None
See application file for complete search history.

(56) References Cited

U.S. PATENT DOCUMENTS

2003/0222838 A1* 12/2003 Iida ...................... G09G 3/3655 345/87
2005/0253835 A1 11/2005 Kawase
2014/0375704 A1* 12/2014 Bi ........................ G09G 3/3275 345/694
2018/0190224 A1 7/2018 Kim et al.
2022/0068184 A1* 3/2022 Oh ........................ G09G 3/3291
2022/0139317 A1* 5/2022 Lee ...................... G09G 3/3233 345/204

(Continued)

FOREIGN PATENT DOCUMENTS

CN 106652905 5/2017
CN 112652267 4/2021
CN 113948033 1/2022

(Continued)

OTHER PUBLICATIONS

CNIPA, Notification to Grant Patent Right for Invention for CN Application No. 202211631618.9, dated Feb. 1, 2023.

*Primary Examiner* — Parul H Gupta
(74) *Attorney, Agent, or Firm* — Hodgson Russ LLP

(57) ABSTRACT

The display device includes: a display panel, having a plurality of pixel assemblies each including a power supply end; a timing control circuit, having a first signal output end configured to output a selection instruction signal, and a second signal output end configured to output a clock signal; and a power circuit, including a voltage generation assembly configured to generate a plurality of step voltages, a voltage selection assembly configured to select at least one step voltage from the plurality of step voltages in response to the selection instruction signal, and a voltage conversion assembly configured to determine a power supply voltage on the basis of the step voltage in response to the clock signal and to output the power supply voltage to the power supply end.

15 Claims, 8 Drawing Sheets

(56) References Cited

U.S. PATENT DOCUMENTS

| | | | | |
|---|---|---|---|---|
| 2022/0139325 | A1* | 5/2022 | Lee | G06F 3/147<br>345/694 |
| 2023/0043940 | A1* | 2/2023 | Bae | G09G 3/3233 |

FOREIGN PATENT DOCUMENTS

| | | |
|---|---|---|
| CN | 114120883 | 3/2022 |
| JP | 2008276027 | 11/2008 |
| WO | 2022095409 | 5/2022 |

* cited by examiner

DISPLAY DEVICE AND DISPLAY METHOD

CROSS-REFERENCE TO RELATED DISCLOSURES

The present disclosure claims priority to Chinese Patent Application 202211631618.9, filed Dec. 19, 2022, the entire disclosure of which is incorporated herein by reference.

TECHNICAL FIELD

The present disclosure relates to the field of display technology, in particular to a display device and a display method.

BACKGROUND

When using display devices, users often need to adjust the brightness of display screens to ensure that they can see the content on the display screens clearly. However, a minimum span voltage that power supply modules in current display devices can output is 0.1 V, which means that the brightness can only be adjusted according to a brightness span corresponding to 0.1 V.

SUMMARY

There are provided a display device and a display method. The technical solution is as below:

According to one aspect of the present disclosure, there is provided a display panel, including: a display panel, having a plurality of pixel assemblies each including a power supply end;

- a timing control circuit, having a first signal output end configured to output a selection instruction signal, and a second signal output end configured to output a clock signal; and
- a power circuit, including a voltage generation assembly configured to generate a plurality of step voltages, a voltage selection assembly connected to the first signal output end and the voltage generation assembly and configured to select at least one step voltage from the plurality of step voltages in response to the selection instruction signal, and a voltage conversion assembly connected to the second signal output end and the voltage selection assembly, configured to determine a power supply voltage on the basis of the step voltage in response to the clock signal, and further connected to the power supply end to output the power supply voltage to the power supply end.

According to a second aspect of the present disclosure, there is provided a display method for driving a display panel, the display panel having a plurality of pixel assemblies each including a power supply end, the display method including:

- generating a selection instruction signal and a clock signal;
- generating a plurality of step voltages, and selecting at least one step voltage from the plurality of step voltages according to the selection instruction signal; and
- determining a power supply voltage on the basis of the step voltage according to the clock signal, and outputting the power supply voltage to the power supply end.

It should be understood that the above general description and the following detailed description are exemplary only and are not intended to limit the present disclosure.

BRIEF DESCRIPTION OF DRAWINGS

The above and other objectives, features and advantages of the present disclosure will become more apparent by describing exemplary embodiments thereof in detail with reference to the accompanying drawings.

DETAILED DESCRIPTION OF THE EMBODIMENTS

Figure 1:
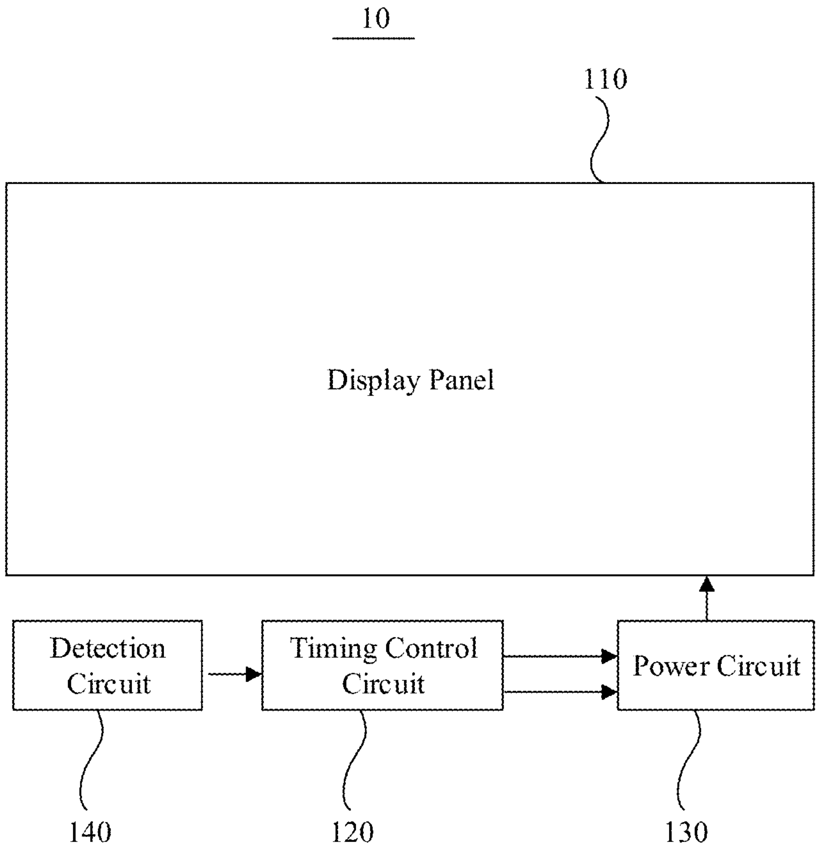
FIG. 1 is a schematic structural diagram of a display device in a first embodiment of the present disclosure.

Although the present disclosure may readily be embodied in different forms of embodiment, however, only some of the specific embodiments are shown in the drawings and will be described in detail in this specification, while it is understandable that this specification should be regarded as an exemplary illustration of the principle of the present disclosure and is not intended to limit the present disclosure to those described herein.

Thus, one feature pointed out in this specification is intended to illustrate one of the features of one embodiment of the present disclosure and is not intended to imply that each embodiment of the present disclosure must have the illustrated feature. In addition, it should be noted that many features are described in this specification. Although certain features may be combined to illustrate a possible system design, these features may also be used for other unspecified combinations. Therefore, the illustrated combinations are not intended to be limiting, unless otherwise stated.

In the embodiments illustrated in the drawings, indications of directions (such as up, down, left, right, front, and back) are used to explain that the structures and movements of various elements of the present disclosure are not absolute but relative. These descriptions are appropriate when these elements are located in the positions shown in the drawings. If the description of the positions of these elements changes, the indications of these directions change accordingly.

The exemplary embodiments will now be described more fully with reference to the accompanying drawings. However, the exemplary embodiments can be implemented in various forms and should not be understood to be limited to the examples elaborated herein; and rather, these exemplary embodiments are provided so that the description of the present disclosure will be more comprehensive and complete, and the concept of exemplary embodiments will be fully communicated to those skilled in the art. The accompanying drawings are only schematic illustrations of the present disclosure and are not necessarily drawn to scale. Like reference signs in the figures denote identical or similar parts and thus repetitive descriptions thereof will be omitted.

The preferred embodiment of the present disclosure is further elaborated below in conjunction with the accompanying drawings of this specification.

Embodiment 1

The technical solution of the present disclosure may be applied to a liquid crystal display (LCD) or an organic light-emitting diode (OLED).

Figure 2:
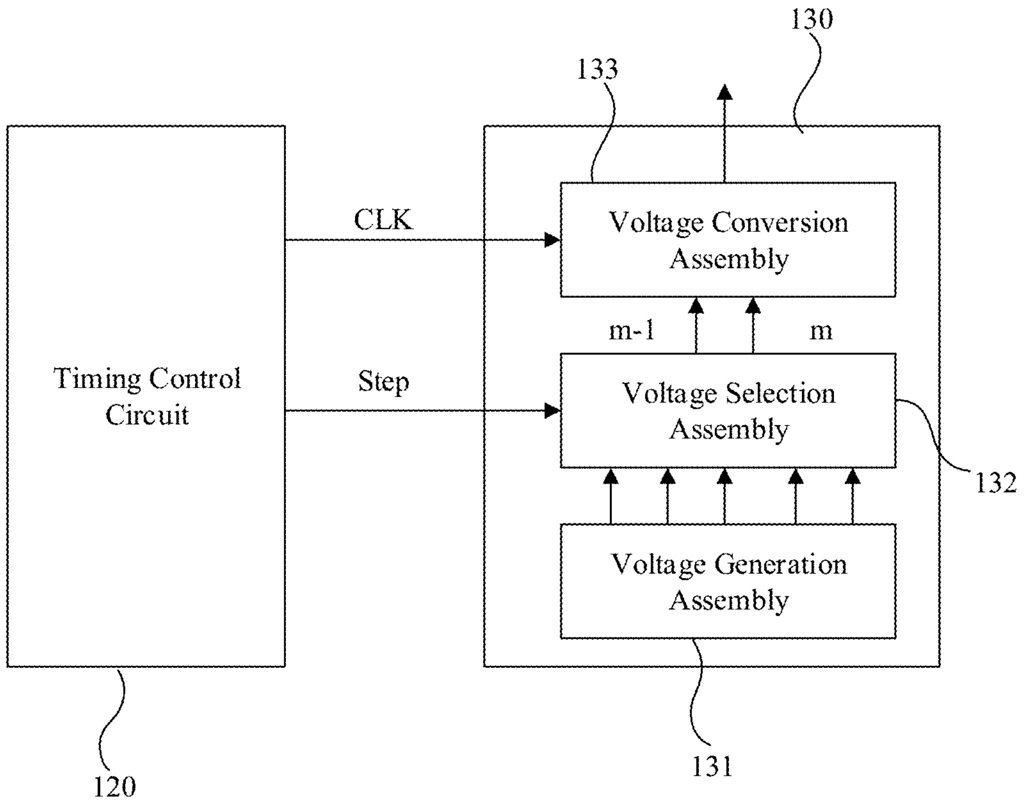
FIG. 2 is a schematic structural diagram of connection between a timing control circuit and a power circuit in FIG. 1 in the present disclosure.

As shown in FIG. 1 and FIG. 2, the present disclosure discloses a display device 10, including a display panel 110. The display panel 110 has a plurality of pixel assemblies. For example, if there are m rows and n columns of pixel assemblies, the pixel assemblies constitute a display panel 110 having an m*n matrix. The pixel assembly includes a power supply end by which power is supplied to the pixel assemblies to ensure its normal display. The display device 10 further includes a timing control circuit 120 and a power circuit 130. The timing control circuit 120 and the power circuit 130 are usually arranged in a bezel position of the display panel 110, which can reduce the blocking of light and ensure normal displayed pictures.

The timing control circuit 120 has a first signal output end configured to output a selection instruction signal (Step), and a second signal output end configured to output a clock signal (CLK). The power circuit 130 is connected to the timing control circuit 120 and can receive the clock signal and the selection instruction signal. Moreover, the power circuit 130 generates a power supply voltage according to the selection instruction signal and the clock signal, and provides the power supply voltage to the power supply ends of the pixel assemblies; and normal display of the pixel assemblies is ensured through the power supply voltage.

Further, the power circuit 130 includes a voltage generation assembly 131, a voltage selection assembly 132, and a voltage conversion assembly 133. The voltage generation assembly 131 is configured to generate a plurality of step voltages. The step voltage refers to a voltage jumping from one value to another one, such as jumping from 0 V to 0.1 V. The step voltage is a minimum span voltage output by the voltage generation assembly 131, such as 0.1 V, 0.2 V, or 0.5 V. The voltage selection assembly 132 is connected to the first signal output end and the voltage generation assembly 131, and is configured to select at least one step voltage from the plurality of step voltages in response to the selection instruction signal, and to output the step voltage to the voltage conversion assembly 133. It should be noted that magnitudes of the plurality of step voltages generated by the voltage generation assembly 131 are equal. The voltage conversion assembly 133 is connected to the second signal output end and the voltage selection assembly 132, respectively. After receiving the clock signal, the voltage conversion assembly 133 determines the power supply voltage on the basis of the step voltage in response to the clock signal. The voltage conversion assembly 133 is further connected to the power supply end to output the power supply voltage to the power supply end. The clock signal is a periodically changing waveform signal. On the basis of the step voltage, the power supply voltage is determined through change in the clock signal and thus is finely regulated.

In the technical solution of this embodiment, the timing control circuit 120 generates the clock signal and the selection instruction signal. The voltage selection assembly 132 selects at least one step voltage from the plurality of step voltages in response to the selection instruction signal, and outputs this step voltage to the voltage conversion assembly 133. After receiving this step voltage, the voltage conversion assembly 133 determines the power supply voltage on the basis of this step voltage according to the clock signal. It may be understood that the step voltages can generate different power supply voltages as the clock signal changes. Thus, the power supply voltage can be finely regulated according to the clock signal to meet the brightness adjustment requirements.

It should be further pointed out that in the present disclosure, the timing control circuit 120 is directly connected to the power circuit 130 and directly transmits the clock signal to the power circuit 130, so that the signal has a shorter delay time.

In addition, compared with a PWM (Pulse width modulation) signal used in backlight control, this solution can implement finer adjustment. The PWM signal is usually used on a constant voltage source to control the constant voltage source to be turned on or off. The adjusted brightness span is larger, so that the brightness distribution is discrete. Secondary adjustment is performed on the basis of the step voltage that has been generated through the clock signal with the higher accuracy. The step voltage is further refined, so that the voltage can be further reduced on the basis of 0.1 V. Consequently, voltage fluctuation controlled by the clock signal is continuous, with higher accuracy.

It should also be pointed out that the use of resistors can be reduced through the control of the clock signal. There is no need to refine the voltage by arranging a large number of resistors. After a resistor that meets the requirements for generating the step voltage is arranged, the voltage is refined by multiplying a duty cycle of the clock signal by the step voltage.

To clearly understand a brightness adjustment direction, the timing control circuit 120 further has a detection signal receiving end. The display device 10 further includes a detection circuit 140 connected to the detection signal receiving end and configured to detect ambient brightness and to input the detected ambient brightness to the timing control circuit 120 through the detection signal receiving end. The timing control circuit 120 is configured to generate the selection instruction signal and the clock signal according to the ambient brightness. The detection circuit 140 is a light sensor that determines the ambient brightness of the display device 10 by receiving the amount of light around the display device 10.

When there is a larger difference between the ambient brightness and the brightness of the display panel 110, an adjustment span of the power supply voltage may be expanded through the generated clock signal to match the brightness of the display panel 110 with the ambient brightness as quickly as possible, thereby ensuring that a user can see displayed pictures clearly. Alternatively, the brightness of the display panel 110 is reduced as quickly as possible to avoid glaring due to higher brightness of the display panel 110.

When there is a smaller difference between the ambient brightness and the brightness of the display panel 110, the adjustment span of the power supply voltage may be narrowed through the generated clock signal, so that the user can find display brightness of the display panel 110 that matches with the ambient brightness, thereby implementing fine adjustment.

Figure 3:
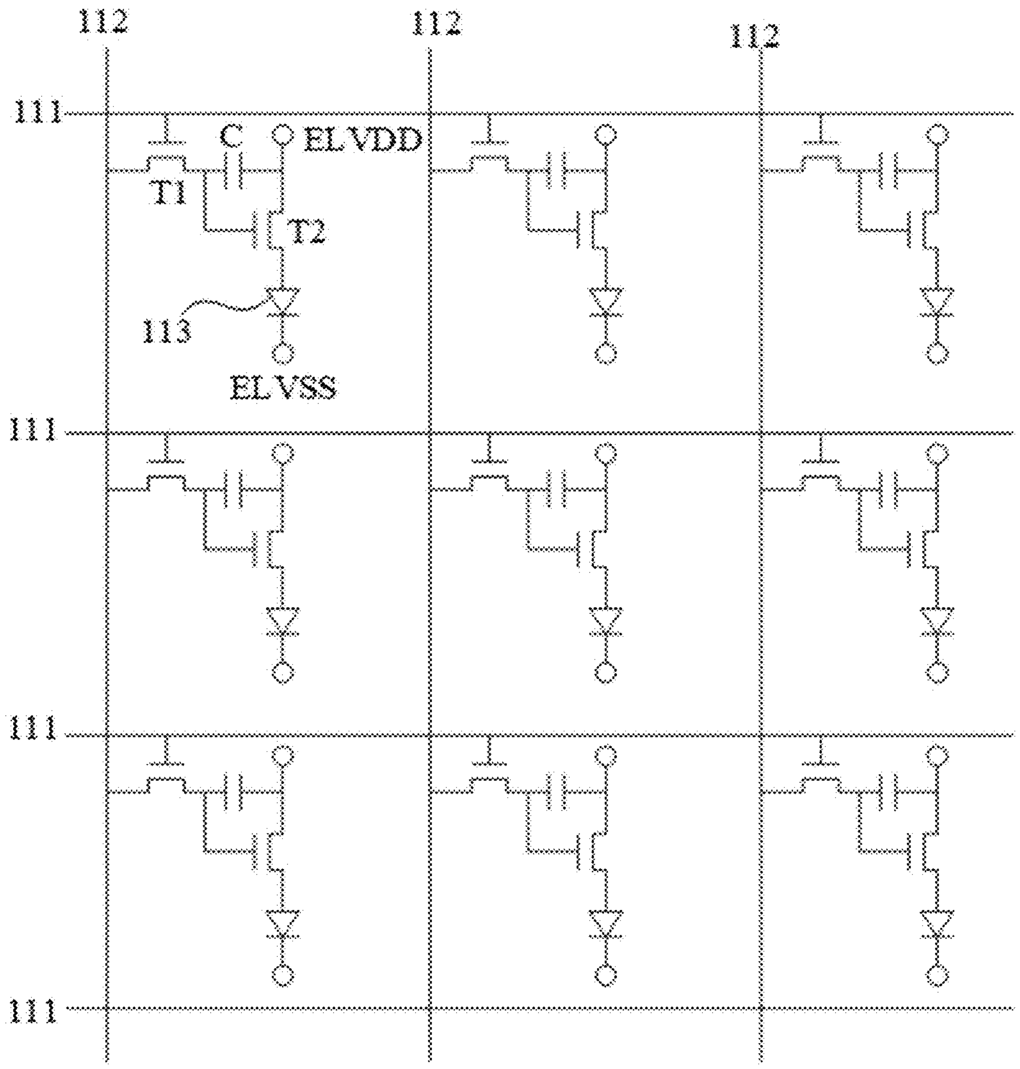
FIG. 3 is a schematic structural diagram of a pixel assembly of a display device during use in an organic light-emitting diode in the present disclosure.

As shown in FIG. 3, the technical solution of the present disclosure is applied to the display panel 110 having organic light-emitting diodes. The pixel assembly includes the organic light-emitting diode 113, and the power supply end of the pixel assembly is a cathode or an anode of the organic light-emitting diode 113, and the cathode or anode of the organic light-emitting diode 113 is connected to the power circuit 130. The pixel assembly further includes a first response switch T1, a second response switch T2, and a capacitor C. The first response switch T1 has a first end connected to a data line 112, a second end connected to a first end of the capacitor C, and a control end connected to a scan line 111. A first end of the second response switch T2 is connected to an operating voltage end (ELVDD), a second end of the capacitor C is connected to a circuit between the second response switch T2 and the operating voltage end, and a control end of the second response switch T2 is connected to a circuit between the second end of the first response switch T1 and the capacitor C. A second end of the second response switch T2 is connected to the anode of the organic light-emitting diode 113, and the cathode of the organic light-emitting diode 113 is connected to a common ground end (ELVSS). The first end is a signal input end, the second end is a signal output end, the control end of the response switch is a gate, the first end of the response switch is a source, and the second end of the response switch is a drain.

The cathode of the organic light-emitting diode 113 is connected to the power circuit 130, which may be understood that the common ground end is connected to the power circuit 130, and the anode of the organic light-emitting diode 113 is connected to the power circuit 130, which may be understood that the operating voltage end is connected to the power circuit 130. It may be seen from this that the power supply voltage may be regulated at an anode end or a cathode end of a light-emitting diode. The light-emitting diode requires a closed circuit to emit light, and the magnitude of the voltage may be regulated at a point on the circuit to control the brightness of the light-emitting diode.

Figure 4:
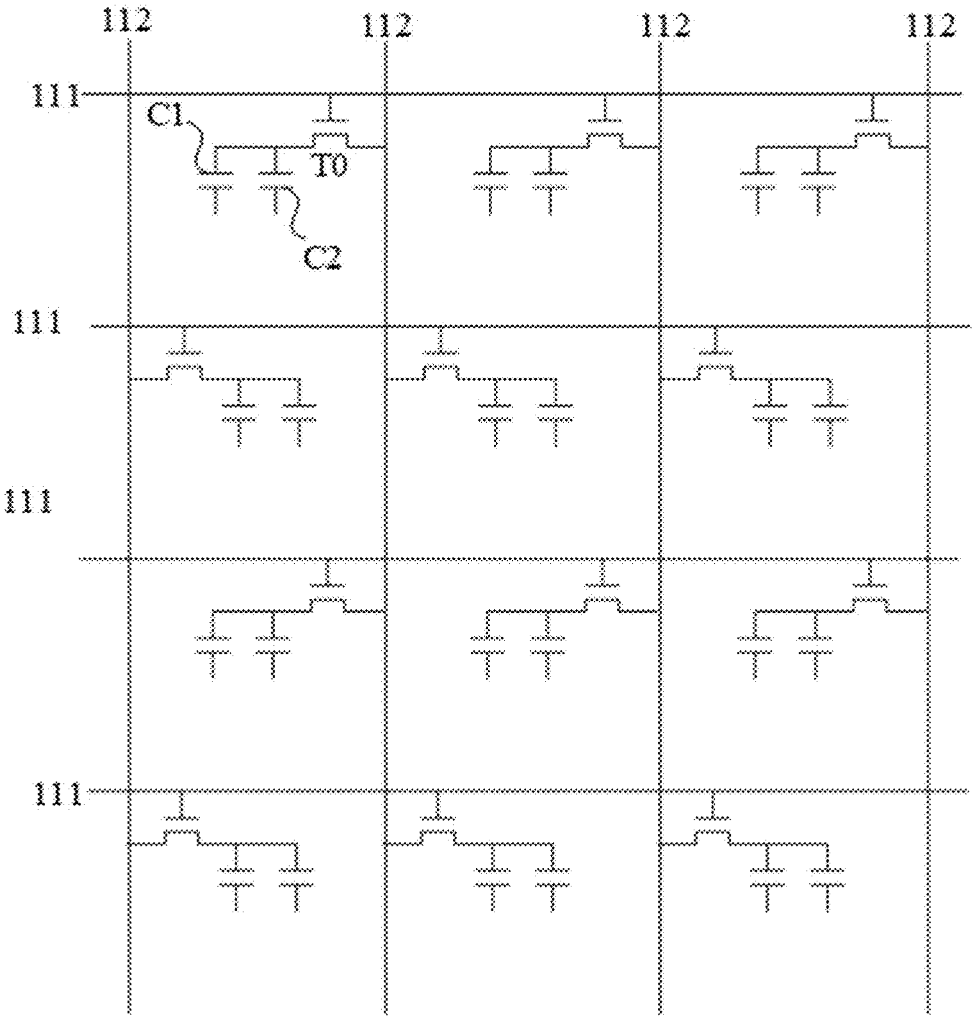
FIG. 4 is a schematic structural diagram of a pixel assembly of a display device during use in a liquid crystal display panel in the present disclosure.

As shown in FIG. 4, the technical solution of the present disclosure is applied to the liquid crystal display panel. A display frequency conversion technology is often used in the liquid crystal display panel 110 to achieve a dynamic refresh rate of the display panel 110. The dynamic refresh rate synchronizes a refresh rate of a compatible display with a frame rate of a graphics card of the user to shorten an input delay to the greatest extent and reduce or completely eliminate issues of jamming, blurred screens, and tearing. A frame of the display panel 110 is divided into an Active area for display time and a Blank area for pause before entering a next frame.

If it is assumed that the display panel 110 with a dynamic refresh rate of 48-240 Hz is taken as an example and a resolution of the display panel 110 is 1920*1080, a total of 1,080 rows for charging need to be scanned, charging time of 1,080 rows is the Active area, then a pause is made for 45 rows, charging time of 45 rows is the Blank area, and the dynamic refresh rate is changed by changing the number of rows of time in the Blank area. For example, when the refresh rate is low, the Blank area is extended, and when the refresh rate is high, the Blank area is shortened. However, the liquid crystal display panel 110 maintains the brightness by maintaining a voltage difference on two sides of a liquid crystal after scanning and charging, due to slow electric leakage on the two sides of the liquid crystal when in the Blank area. If the time in the Blank area is too long and the electric leakage is severe, the brightness of the display panel 110 will change. As a result, switching of the refresh rate will lead to visible changes in brightness.

Therefore, in the technical solution of the present disclosure, the pixel assembly includes a driving transistor TO, a pixel electrode, a common electrode, and a liquid crystal layer, wherein the driving transistor TO has a control end connected to the scan line 111, a first end connected to the data line 112, and a second end connected to the pixel electrode, the common electrode is connected to the power supply end, the pixel electrode and the common electrode are located on two sides of the liquid crystal layer, and the pixel electrode and the common electrode form a liquid crystal capacitor C1. The liquid crystal capacitor C1 generates a regulated voltage that is applied to the liquid crystal layer to change a rotation direction of liquid crystal molecules in the liquid crystal layer. The power circuit 130 is configured to provide the power supply voltage to a common electrode of the liquid crystal capacitor C1. In the Blank area, a voltage of the liquid crystal capacitor C1 is finely regulated through the power supply voltage provided by the power circuit 130 to the liquid crystal capacitor C1, to more accurately control the rotation direction of the liquid crystal molecules.

Further, the pixel assembly further includes a common signal line arranged on a same layer as the pixel electrode, insulated from the pixel electrode, and connected to the power supply end, and the common signal line and the common electrode form a storage capacitor C2. The liquid crystal capacitor C1 and the storage capacitor C2 are connected in parallel. The power circuit 130 charges the storage capacitor C2, and the storage capacitor C2 maintains the voltage of the liquid crystal capacitor C1 through capacitive coupling. The voltage of the liquid crystal capacitor C1 is compensated in the Blank area to compensate for the electric leakage, thereby reducing the rotation of the liquid crystal molecules due to the electric leakage, keeping a rotational state of the liquid crystal molecules unchanged, and reducing the changes in brightness during frequency switching.

Figure 5:
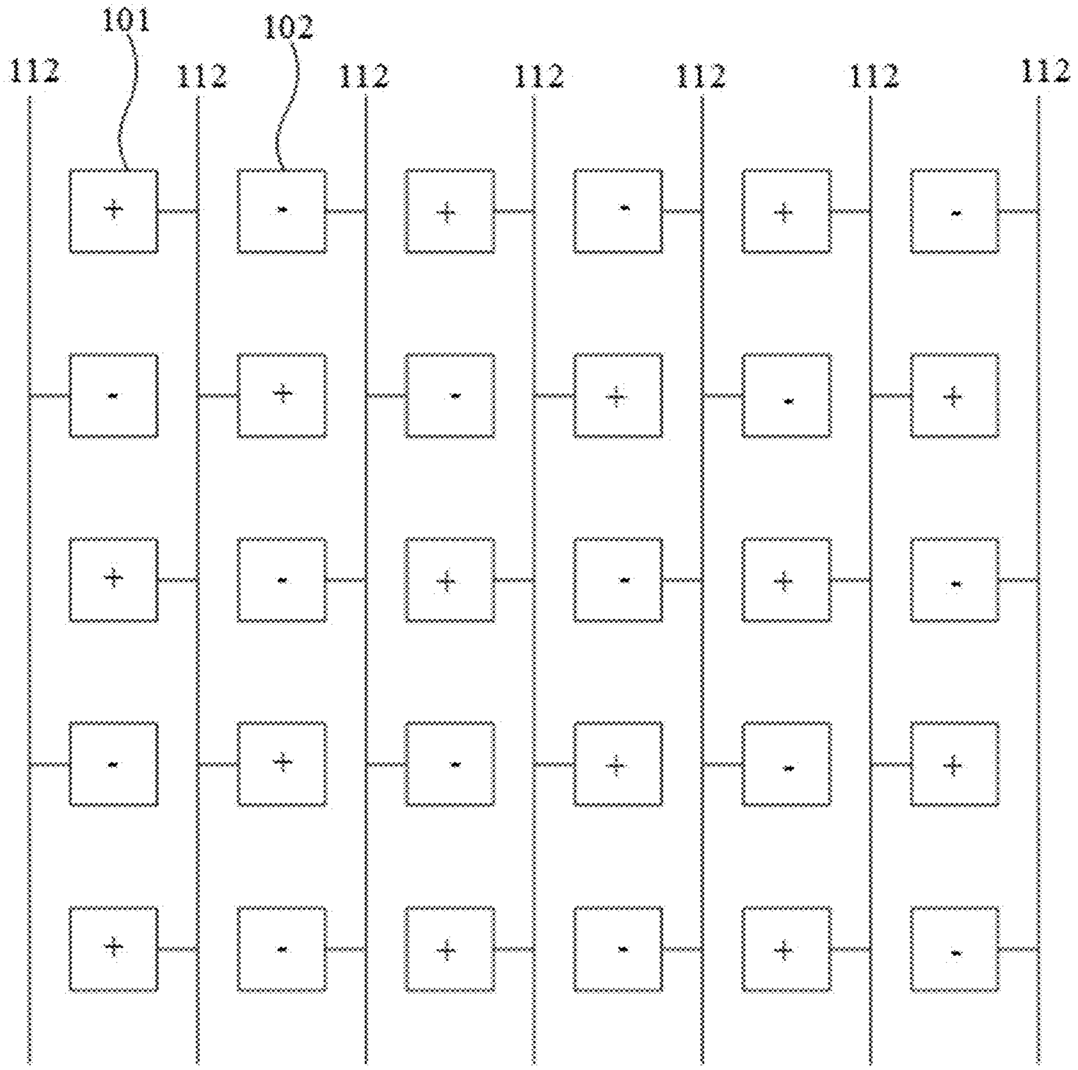
FIG. 5 is a schematic structural diagram of positive and negative polarity distribution display of the pixel assembly in the liquid crystal panel in FIG. 4 in the present disclosure.

As shown in FIG. 5, in the display panel 110 of the present disclosure, alternating positive and negative voltages are usually applied to the pixel assemblies, so as to avoid polarization of the liquid crystal molecules due to a voltage having single polarity. The pixel assemblies have two display polarities in which one is positive polarity display and the other is negative polarity display. Specifically, the plurality of pixel assemblies includes a first subpixel 101 and a second subpixel 102 that have opposite display polarities, and the power circuit 130 is connected to a power supply end of the first subpixel 101 and a power supply end of the second subpixel 102, respectively, and is configured to provide a power supply voltage having opposite positive and negative polarities to the first subpixel and the second subpixel.

The first subpixel 101 and the second subpixel 102 may be alternately distributed on the display panel 110, with the same display polarity on the same data line 112. For example, if the first subpixel 101 performs the positive polarity display, the second subpixel 102 performs the negative polarity display. If the first subpixel 101 performs the negative polarity display, the second subpixel 102 performs the positive polarity display. The first subpixel 101 and the second subpixel 102 are powered separately, making it more targeted. It should be noted that the positive and negative polarities of the first subpixel 101 and the second subpixel 102 change alternately. The positive polarity refers to that the power supply voltage is higher than a voltage of the common electrode of the liquid crystal capacitor C1, while the negative polarity refers to that the power supply voltage is lower than the voltage of the common electrode of the liquid crystal capacitor C1.

Embodiment 2

Figure 6:
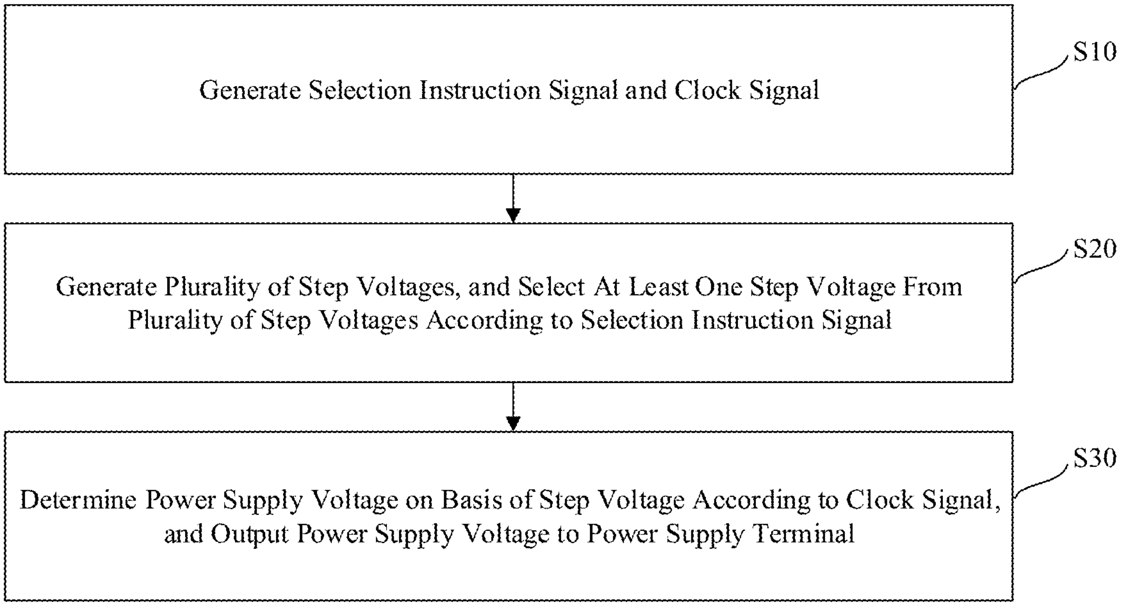
FIG. 6 is a schematic flowchart of steps of a display method in a second embodiment of the present disclosure.

As shown in FIG. 6, the present disclosure further provides a display method for driving a display panel, the display panel having a plurality of pixel assemblies each including a power supply end, the display panel being an organic light-emitting diode or a liquid crystal display panel, the display method including:

Step S10: generating a selection instruction signal and a clock signal, wherein the selection instruction signal is configured to control the selection of a step voltage, and the clock signal is a periodically changing pulse signal, usually a square waveform pulse signal.

Step S20: generating a plurality of step voltages, and selecting at least one step voltage from the plurality of step voltages according to the selection instruction signal.

Step S30: determining a power supply voltage on the basis of the step voltage according to the clock signal, and outputting the power supply voltage to the power supply end. The clock signal is periodically changing, and the step voltage may also be periodically changing according to the clock signal. The step voltage is a minimum span voltage. By combining the step voltage with the clock signal, a voltage lower than the step voltage can be achieved, to implement fine regulation of the power supply voltage.

In the technical solution of this embodiment, at least one step voltage is selected from the plurality of step voltages according to the selection instruction signal, and the power supply voltage is determined on the basis of this step voltage according to the clock signal. It may be understood that the step voltages can generate different power supply voltages as the clock signal changes. Thus, the power supply voltage can be finely regulated according to the clock signal to meet the brightness adjustment requirements.

Figure 7:
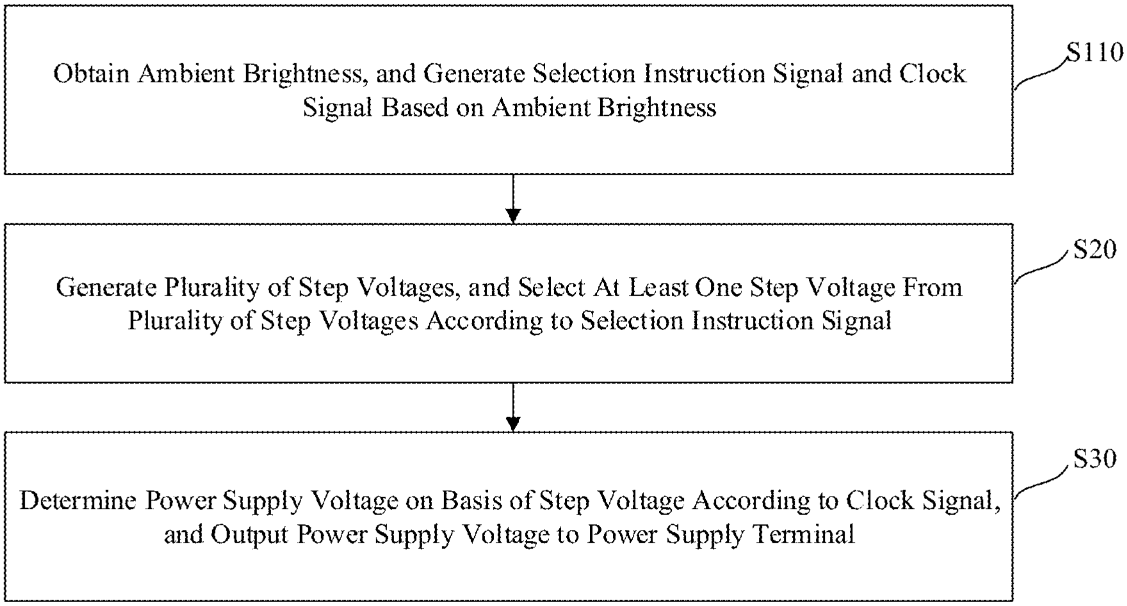
FIG. 7 is a schematic flowchart of a step S110 of a display method in the present disclosure.

As shown in FIG. 7, to clearly understand a brightness adjustment direction, the step of generating a selection instruction signal and a clock signal includes:

Step S110: obtaining ambient brightness, and generating a selection instruction signal and a clock signal based on the ambient brightness. Duty cycles of clock signals generated based on different ambient brightness are different. The duty cycle is a ratio of a pulse width to a pulse period of the clock signal. The pulse width is a time length of a high level in the clock signal, and the pulse period is a time length of a complete pulse waveform. It may be seen from this that the duty cycle is the ratio of the time length of the high level to the time length of the complete pulse wavelength. Usually, the time length of the pulse period is constant. When the brightness of the display panel 110 needs to be adjusted, by adjusting a duration of the high level, the generated duty cycle changes accordingly, and the corresponding clock signal also changes. When the display brightness needs to be adjusted, it may be completed by only changing the pulse width of the clock signal.

Thus, it may be seen that the duty cycle of the clock signal varies with changes in ambient brightness. When there is a larger difference between the ambient brightness and the brightness of the display panel 110, or when there is a smaller difference between the ambient brightness and the brightness of the display panel 110, the accuracy may be controlled through the generated clock signal to achieve the brightness that needs to be adjusted within a short time.

For example, when there is a larger difference between the ambient brightness and the brightness of the display panel 110, the duty cycle is increased to match the brightness of the display panel 110 with the ambient brightness as quickly as possible, thereby ensuring that a user can see displayed pictures clearly. Alternatively, the brightness of the display panel 110 is reduced as quickly as possible to avoid glaring due to higher brightness of the display panel 110.

When there is a smaller difference between the ambient brightness and the brightness of the display panel 110, the adjustment span of the power supply voltage is narrowed by reducing the duty cycle, so that the user can find display brightness of the display panel 110 that matches with the ambient brightness, and the miss of more suitable display brightness due to overadjustment is avoided.

Figure 8:
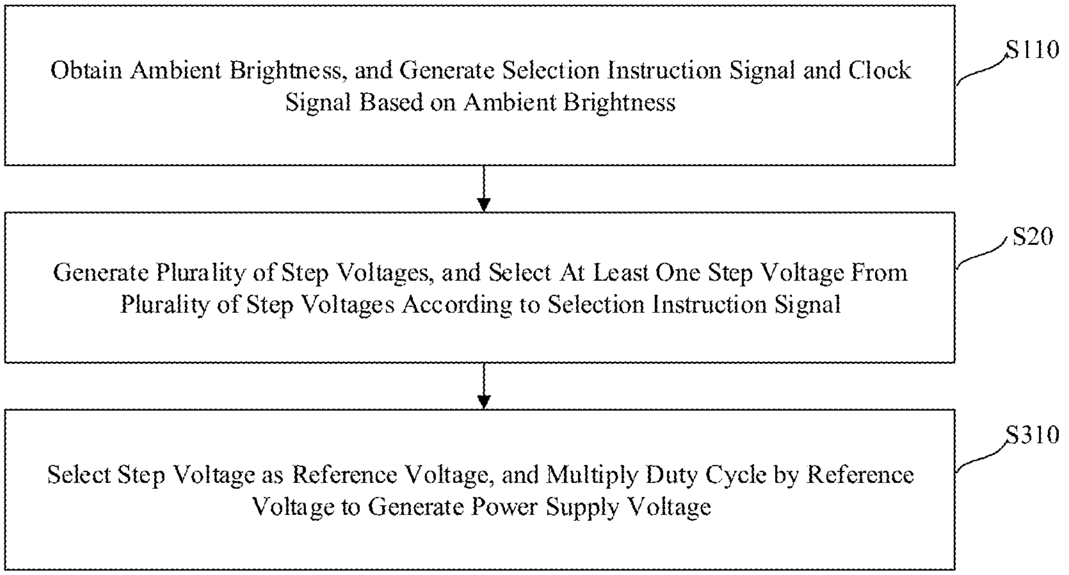
FIG. 8 is a schematic flowchart of a step S310 of a display method in the present disclosure.

Referring to FIG. 8, to adjust the brightness of the display panel 110 more flexibly, the step of determining a power supply voltage on the basis of the step voltage according to the clock signal includes:

Step S310: selecting the step voltage as a reference voltage, and multiplying the duty cycle by the reference voltage to generate the power supply voltage. The step voltage is multiplied by the duty cycle, equivalently, it is multiplied by a decimal fraction, so that the step voltage is further reduced, thereby implementing the regulation of a voltage lower than the step voltage. For example, a voltage generation assembly 131 may output n step voltages with a difference of 0.1 V. One of the step voltages is selected as the reference voltage, and the duty cycle is multiplied by this reference voltage to obtain the power supply voltage.

Usually, the time length of the pulse period is constant. When the brightness of the display panel 110 needs to be adjusted, by adjusting a duration of the high level, the generated duty cycle changes accordingly, and the corresponding clock signal also changes. When the display brightness needs to be adjusted, it may be completed by only changing the pulse width of the clock signal.

Figure 9:
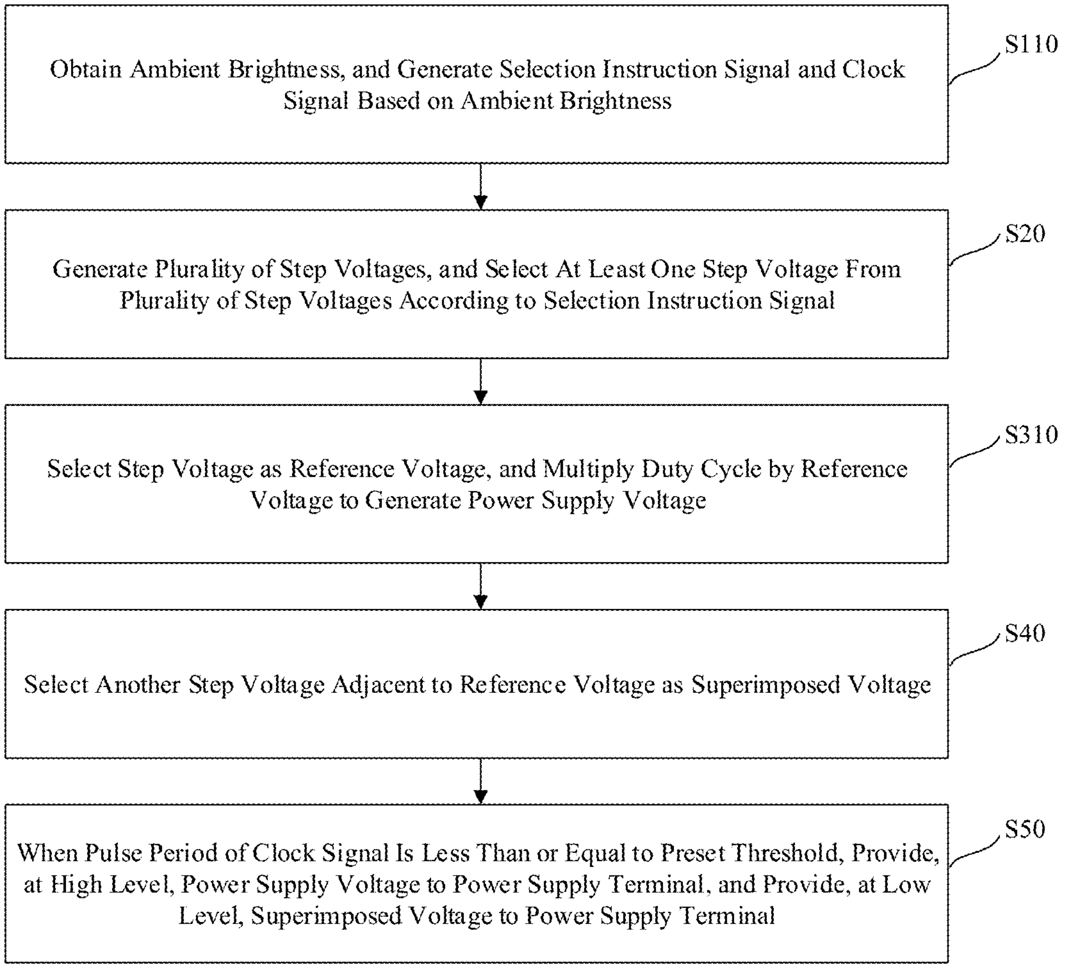
FIG. 9 is a schematic flowchart of a step S40 and a step S50 of a display method in the present disclosure.

As shown in FIG. 2 and FIG. 9, after the step of determining a power supply voltage on the basis of the step voltage according to the clock signal, the display method includes:

Step S40: selecting another step voltage adjacent to the reference voltage as a superimposed voltage. To improve the brightness of pictures, two voltages may be applied continuously within a short time, so that human eyes can see that two beams of light are superimposed together.

Step S50: when the pulse period of the clock signal is less than or equal to a preset threshold of 1 ms in which the human eyes cannot perform recognition, providing, at a high level, the power supply voltage to the power supply end, and providing, at a low level, the superimposed voltage to the power supply end.

Figure 10:
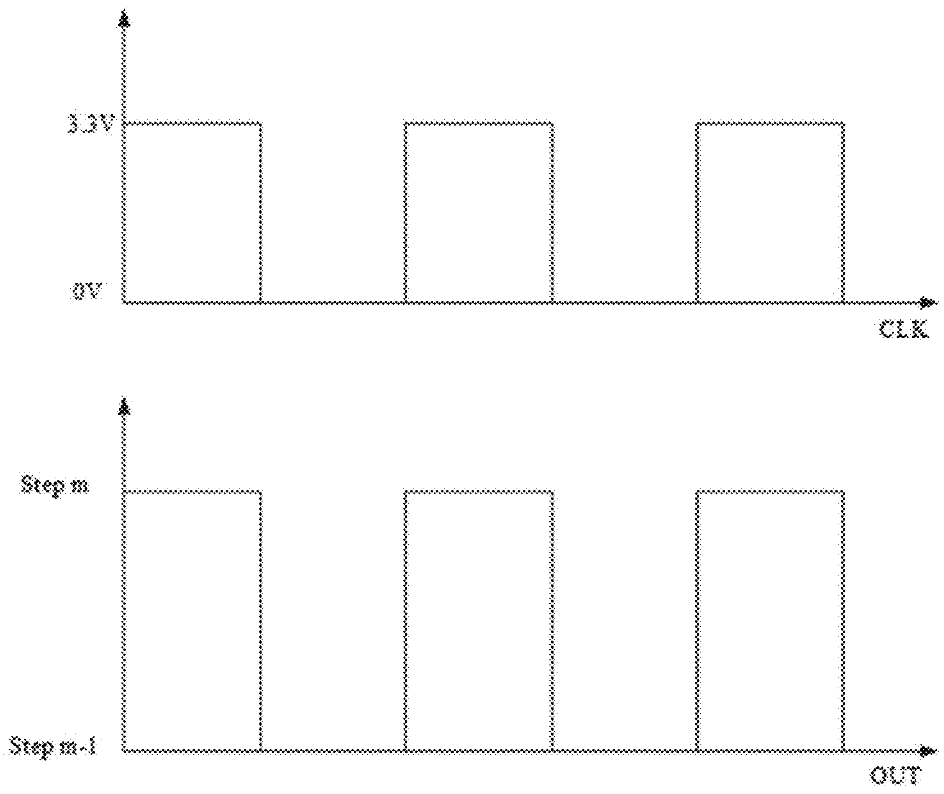
FIG. 10 is schematic diagram of a step voltage output with a clock signal in the present disclosure.

As shown in FIG. 10, a voltage selection assembly 132 outputs $m^{th}$ and $(m-1)^{th}$ adjacent step voltages according to the selection instruction signal of the timing control circuit 120, wherein $n \geq m \geq 2$; and after reaching the voltage conversion assembly, according to a CLK waveform of the clock signal, the $m^{th}$ step voltage is output when CLK is at a high level H, and the $(m-1)^{th}$ step voltage is output when CLK is at a low level L. The light intensity is a cumulative effect. If a CLK frequency is greater than 1 KHz, that is, it is less than 1 ms, the human eyes will not feel the flicker of CLK switching at all, and the light intensity felt by the human eyes is the light intensity when a voltage obtained through a formula of $(m-1)^{th}$ step voltage +0.1 V*(CLK H time/CLK cycle time) serves as the power supply voltage, thus implementing fine compensation for the light intensity. A 3.3 V clock signal is at a high level, and a 0 V clock signal is at a low level. A step voltage (OUT) Step m is output at a high level, while a step voltage (OUT) Step m−1 is output at a low level.

In the technical solution of the present disclosure, the timing control circuit generates the clock signal and the selection instruction signal. The voltage selection assembly selects at least one step voltage from the plurality of step voltages in response to the selection instruction signal, and outputs this step voltage to the voltage conversion assembly. After receiving this step voltage, the voltage conversion assembly determines the power supply voltage on the basis of this step voltage according to the clock signal. It may be understood that the step voltages can generate different power supply voltages as the clock signal changes. Thus, the power supply voltage can be finely regulated according to the clock signal to meet the brightness adjustment requirements.

Although the present disclosure has been described with reference to several exemplary embodiments, it should be understood that the terms used are illustrative and exemplary and are not limiting. Since the present disclosure can be embodied in various forms without departing from the spirit or essence of the invention, it should be understood that the foregoing embodiments are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. A display device, comprising:

a display panel, having a plurality of pixel assemblies each comprising a power supply end;

a timing control circuit, having a first signal output end configured to output a selection instruction signal, and a second signal output end configured to output a clock signal; and a power circuit, comprising a voltage generation assembly configured to generate a plurality of step voltages, a voltage selection assembly connected to the first signal output end and the voltage generation assembly and configured to select at least one step voltage from the plurality of step voltages in response to the selection instruction signal, and a voltage conversion assembly connected to the second signal output end and the voltage selection assembly, configured to determine a power supply voltage based on the step voltage in response to the clock signal, and further connected to the power supply end to output the power supply voltage to the power supply end, wherein the pixel assembly comprises an organic light-emitting diode, and the power supply end of the pixel assembly is an anode of the organic light-emitting diode;

wherein the pixel assembly further includes a first response switch, a second response switch, and a capacitor, wherein the first response switch has a first end connected to a data line, a second end connected to a first end of the capacitor, and a control end connected to a scan line: wherein a first end of the second response switch is connected to an operating voltage end, a second end of the capacitor is connected to a circuit between the second response switch and the operating voltage end, and a control end of the second response switch is connected to a circuit between the second end of the first response switch and the capacitor.

2. The display device according to claim 1, wherein the timing control circuit further has a detection signal receiving end;

wherein the display device further comprises a detection circuit connected to the detection signal receiving end and configured to detect ambient brightness and to input the detected ambient brightness into the timing control circuit through the detection signal receiving end;

wherein the timing control circuit is configured to generate the selection instruction signal and the clock signal according to the ambient brightness.

3. The display device according to claim 2, wherein the detection circuit is a light sensor that determines ambient brightness of the display device by receiving an amount of light around the display device.

4. The display device according to claim 1, wherein a cathode of the organic light-emitting diode is connected to the power circuit.

5. The display device according to claim 1, wherein the anode of the organic light-emitting diode is connected to the power circuit.

6. The display device according to claim 1, wherein the pixel assembly comprises an organic light-emitting diode, and the power supply end of the pixel assembly is a cathode of the organic light-emitting diode.

7. The display device according to claim 1, wherein the pixel assembly comprises a driving transistor, a pixel electrode, a common electrode, and a liquid crystal layer, the driving transistor has a control end connected to a scan line, a first end connected to a data line, and a second end connected to the pixel electrode, wherein the common electrode is connected to the power supply end, the pixel electrode and the common electrode are located on two sides of the liquid crystal layer, and the pixel electrode and the common electrode form a liquid crystal capacitor.

8. The display device according to claim 7, wherein the pixel assembly further comprises a common signal line insulated from the pixel electrode and connected to the power supply end, and the common signal line and the common electrode form a storage capacitor.

9. The display device according to claim 8, the liquid crystal capacitor and the storage capacitor are connected in parallel, the power circuit charges the storage capacitor, and the storage capacitor maintains the voltage of the liquid crystal capacitor through capacitive coupling.

10. The display device according to claim 1, wherein the plurality of pixel assemblies comprise a first subpixel and a second subpixel that have opposite display polarities, and the power circuit is connected to a power supply end of the first subpixel and a power supply end of the second subpixel, respectively, and is configured to provide a power supply voltage having opposite positive and negative polarities to the first subpixel and the second subpixel.

11. The display device according to claim 10, wherein the first subpixel and the second subpixel are alternately distributed on the display panel, with a same display polarity on a same data line.

12. A display method for driving a display panel of a display device, the display panel having a plurality of pixel assemblies each comprising a power supply end, wherein the display device comprises:

the display panel;

a timing control circuit, having a first signal output end configured to output a selection instruction signal, and a second signal output end configured to output a clock signal; and a power circuit, comprising a voltage generation assembly configured to generate a plurality of step voltages, a voltage selection assembly connected to the first signal output end and the voltage generation assembly and configured to select at least one step voltage from the plurality of step voltages in response to the selection instruction signal, and a voltage conversion assembly connected to the second signal output end and the voltage selection assembly, configured to determine a power supply voltage based on the step voltage in response to the clock signal, and further connected to the power supply end to output the power supply voltage to the power supply end:

wherein each pixel assembly further comprises an organic light-emitting diode, and the power supply end of each pixel assembly is an anode of the organic light-emitting diode;

wherein each pixel assembly further includes a first response switch, a second response switch, and a capacitor, wherein the first response switch has a first end connected to a data line, a second end connected to a first end of the capacitor, and a control end connected to a scan line: wherein a first end of the second response switch is connected to an operating voltage end, a second end of the capacitor is connected to a circuit between the second response switch and the operating voltage end, and a control end of the second response switch is connected to a circuit between the second end of the first response switch and the capacitor;

wherein the display method comprises:

generating a selection instruction signal and a clock signal;

generating a plurality of step voltages, and selecting at least one step voltage from the plurality of step voltages according to the selection instruction signal; and determining a power supply voltage based on the step voltage according to the clock signal, and outputting the power supply voltage to the power supply end.

13. The display method according to claim 12, wherein generating the selection instruction signal and the clock signal comprises:

obtaining ambient brightness, and generating the selection instruction signal and the clock signal based on the ambient brightness;

wherein duty cycles of the clock signals generated based on different ambient brightness are different.

14. The display method according to claim 13, wherein determining the power supply voltage based on the step voltage according to the clock signal comprises:

selecting the step voltage as a reference voltage, and multiplying the duty cycle by the reference voltage to generate the power supply voltage.

15. The display method according to claim 14, wherein after determining the power supply voltage based on the step voltage according to the clock signal, the display method comprises:

selecting another step voltage adjacent to the reference voltage as a superimposed voltage;

wherein when a pulse period of the clock signal is less than or equal to a preset threshold, providing, at a high level, the power supply voltage to the power supply end, and providing, at a low level, the superimposed voltage to the power supply end.

* * * * *